3,766,238
3-NITRO-4-PHENOXY BENZONITRILES

Otto Rohr, Therwil, Switzerland, assignor to Ciba-Geigy AG, Basel, Switzerland
No Drawing. Continuation of abandoned application Ser. No. 697,327, Jan. 12, 1968. This application Nov. 19, 1970, Ser. No. 91,172
Claims priority, application Switzerland, Jan. 20, 1967, 886/67
Int. Cl. C07c *121/74*
U.S. Cl. 260—465 F  1 Claim

ABSTRACT OF THE DISCLOSURE

The present invention relates to compounds of the general formula

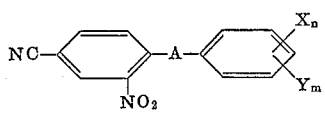

in which X represents a halogen atom, a lower alkyl radical containing 1 to 4 carbon atoms or one of the groups —$OCH_3$, —$SCH_3$, —CN, —$NO_2$ or —$CF_3$, Y represents a halogen atom or a lower alkyl radical containing 1 to 4 carbon atoms, $m$ and $n$ each represents 0, 1, 2 or 3, and A represents an oxygen or a sulphur atom, as well as to preparations for combating phytopathogenic nematodes containing, as active ingredient, a compound as defined above, together with a suitable carrier.

---

CROSS REFERENCE TO RELATED APPLICATION

This is a continuation of application Ser. No. 697,327, filed Jan. 12, 1968, now abandoned.

The present invention provides compounds of the general formula

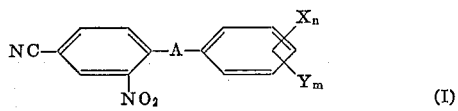

in which X represents a halogen atom, a lower alkyl radical containing 1 to 4 carbon atoms or one of the groups —$OCH_3$, —$SCH_3$, —CN, —$NO_2$ or —$CF_3$, Y represents a halogen atom or a lower alkyl radical containing 1 to 4 carbon atoms, $m$ and $n$ each represents 0, 1, 2 or 3, and A represents an oxygen or a sulphur atom.

The present invention also provides a pest control preparation, especially a preparation for combating phytopathogenic nematodes, comprising, as active ingredient, an active substance of the Formula I given above, having the meanings for the symbols A, X, Y, $m$ and $n$ as given above, together with a suitable carrier. If desired, the preparation may contain one or more of the following additives: a solvent, a diluent, a dispersant, a wetting agent, an adhesive and other pest control agents.

Amongst the new compounds, that which possesses the formula

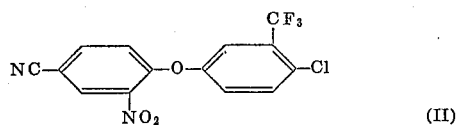

is particularly valuable.

Apart from the nematocidal effect, the active substances of the Formulae I and II also display an activity against humanopathogenic and phytopathogenic fungi and bacteria, against acarides, insects, water pests, for example, algae and Sedentara and against molluscs, especially Gastropoda.

The active substances of this invention may also be used for combating endoparasites, for example, Taeniadae.

The preparations of this invention may be used for controlling a wide variety of phytopathogenic nematodes, for example, *Melodogyne arenaria*, *Pratylenchus* sp. and *Ditylenchus dipsaci*.

When used for combating nematodes, the new compounds of the Formulae I and II according to this invention may be applied in solid form, for example, as a finely powdered casting preparation or granulate, or in liquid form as emulsions, suspensions or solutions. The form of application chosen depends on the way in which the preparation is to be applied, which in turn depends especially on the kind of nematodes to be controlled, on the plant culture to be protected, the climate and the soil conditions as well as on the working conditions. In most cases, it is advantageous to distribute the active substance as evenly as possible over a soil layer that is about 15 to 25 cm. deep, and the amount of active substance applied generally varies from 5 to 250 kg. per hectare. It is also possible to apply the substance locally, for example in plant holes or seed rows, which under certain conditions may ensure adequate protection together with a reduced consumption of active substance.

Dusting agents can be prepared by mixing or grinding together the active substance with a solid, pulverulent, water-insoluble or sparingly soluble vehicle, for example talcum, diatomaceus earth, kieselguhr, kaloin, bentonites, calcium carbonate, boric acid or tricalciumphosphate.

Alternatively, the active substance may be applied to the vehicle in the form of a solution in a volatile solvent. In manufacturing casting preparations, there may be used coarse grained and/or specifically heavier vehicles, for example, coarsely ground limestone, sand or loess, or mixtures of the active substance with vehicles that are more finely granular and may be porous and may be granulated.

Casting preparations may also contain, as vehicles, coarsely granular, if desired granulated, solid substances that are more readily soluble in water or citrate solutions, for example, fertilizers, for example decomposed calcium phosphates or other calcium, potassium or ammonium salts, loess, phosphates or nitrates. Emulsions of this invention may be used on fallow land and, because of their penetrating power, they may also be used in standing plant cultures. They are prepared, for example, by dissolving the active substance in an organic solvent, for example, in xylene, and emulsifying this solution in water containing a surface-active substance. When emulsions are to be used, it is generally advantageous first to manufacture a concentrate by combining the active substance with an inert organic solvent and/or surface-active substance (emulsifier); such a concentrate constitutes a single-phase or multi-phase system which can be diluted with water to furnish an emulsion ready for use. Suitable surface-active substances (emulsifiers) are cationic substances, for example, quaternary ammonium salts, anionic substances for example salts of aliphatic long-chain alkoxyacetic acids and aliphatic-aromatic sulphonic acids, and non-ionic, surface-active substances, for example, polyethyleneglycol ethers of aliphatic alcohols or of dialkylphenols and polycondensation products of ethylene oxide, and also amphoteric surface-active substances. As examples of solvents for the manufacture of emulsion concentrates there may be mentioned: cyclic hydrocarbons, for example, benzene, toluene, xylene, ketones, alcohols and further solvents, for example, ethyl acetate, dioxane, acetone-glycerine or diacetone alcohol.

Suspensions may be prepared by direct suspension of the moist active substances in water, which may contain a surface-active substance, or by suspending wettable powders which themselves have been prepared by mixing solid active substances with surface-active substances or with solid, pulverulent vehicles or surface-active substances.

Especially suitable as solvents for the active substances to be used according to this invention are halogenated hydrocarbons having a nematocidal effect of their own, for example, 1,2-dibromo-3-chloropropene, dichlorobutene or dichloropropane+dichloropropene mixtures whose brief nematocidal effect is complemented in a valuable manner by the permanent effect of the active substances to be used according to this invention.

In the concentrations generally applied in pest control the active substances of this invention are not phytotoxic, so that the plant growth is not damaged. If desired, the biological activity of the preparations of this invention may be complemented by adding fungicidal, herbicidal or insecticidal or further nematocidal active substances.

The following Example 1 illustrates the manufacture of the active substances which are novel and are used in the preparations of this invention. Further examples illustrate the test method used in determining the efficacy and the manufacture of some variants of the preparations of this invention. Parts in these examples are by weight.

EXAMPLE 1

40 grams of 4-chloro-3-trifluoromethylphenol are dissolved in 50 ml. of dimethylformamide, in a stirring flask. This solution is mixed with a solution of 11.2 g. of potassium hydroxide in 10 ml. of water, and then a solution of 36.5 g. of 4-cyano-2-nitrochlorobenzene in about 10 ml. of dimethylformamide is added drop by drop. The reaction mixture is heated for 2 hours at the reflux temperature, and is then steam distilled. The oily residue is extracted with ether. The extract is evaporated and the residue recrystallized from benzene+petroleum ether, to furnish crystals melting at 108 to 112° C. (compound No. 1).

The following compounds may be prepared in a similar manner:

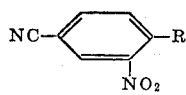

| R | | M.P., ° C |
| --- | --- | --- |
| 2 | —S—⟨⟩—Cl | 155–159 |
| 3 | —O—⟨⟩—Cl | 137–138 |
| 4 | —O—⟨⟩—Cl (Cl) | 117–120 |
| 5 | —O—⟨⟩—Cl (Cl) | 108–111 |
| 6 | —O—⟨⟩ (CH₃, CH₃) | 102–104 |
| 7 | —O—⟨⟩—NO₂ | 152–155 |

EXAMPLE 2

20 parts of the active substance No. 1 are dissolved in a mixture of 48 parts of diacetone alcohol, 16 parts of xylene and 16 parts of an anhydrous high-molecular condensation product of ethylene oxide with a mixture of higher fatty acids. This concentrate may be diluted with water to form nematocidal emulsions of any desired concentration.

EXAMPLE 3

80 parts of the active substance No. 1 are mixed with 2 to 4 parts of a wetting agent, for example, the sodium salt of an alkylpolyglycol ether monosulphate, 1 to 3 parts of a protective colloid, for example, sulphite cellulose waste liquor, and 15 parts of an inert, solid vehicle, for example, kaolin, bentonite, chalk or kieselguhr and then finely ground in a suitable mill. The resulting wettable powder may be pasted with water, to furnish a very stable nematocidal suspension.

EXAMPLE 4

5 parts of the active substance No. 1 are mixed with 95 parts of calcium carbonate and the mixture is ground. The product is used as a nematocidal casting agent.

EXAMPLE 5

5 parts of one of the active substances shown in the preceding examples or of another active substance of the general Formula I are mixed with 95 parts of a pulverulent vehicle, for example, sand or calcium carbonate, and moistened with 1 to 5 parts of water or isopropanol, and the mixture is granulated. Before granulating the mixture described, or a mixture richer in active substance consisting, for example of 10 parts of active substance and 90 parts of calcium carbonate, there may be incorporated with it a multiple of its own weight, for example, 100 to 900 parts, of a fertilizer, which may be water-soluble, for example, ammonium sulphate.

EXAMPLE 6

20 parts of the active substance and 80 parts of talcum are ground extremely fine in a ball mill. The resulting mixture is usued as a nematocidal dusting agent.

EXAMPLE 7

By mixing 50 parts of one of the active substances shown in the preceding examples or of another active substance of the Formula I, 45 parts of xylene, 2.5 parts of an ethylene oxide condensation product of an alkylphenol and 2.5 parts of a mixture of the sodium salt of dodecyl-oxyethyl-sulphuric acid, a solution is obtained which, on emulsification in water, may be used as a nematocide.

EXAMPLE 8

To test the nematocidal efficacy in vitro, the active substances of the Formula I are formulated in the following manner: The active substance is dissolved in a small quantity of acetone with addition of an emulsifier, for example, polyoxyethylene-sorbitol monooleate, and by adding well deaerated water the desired dilutions are obtained.

The test for the nematocidal effect is carried out as follows: 5-litre bottles are filled two-thirds full with very thoroughly washed quartz sand. Then 1 cc. of the solution to be tested is added and the bottles are stirred very thoroughly to ensure good mixing. About 100 nematodes (*Panagrellus redivivus*) are then introduced into each bottle. The bottles are closed and once more shaken, and then left by themselves for 48 hours. The number of dead nematodes is then ascertained. 4 tests were made for each concentration.

The following results were obtained: Compound No. 1 of Example 1, in a concentration of 25 parts per million, proved 92% lethal. Similar good effects were obtained with the other compounds described in Example 1.

What is claimed is:
1. The compound of the formula
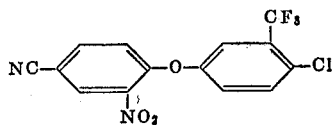
References Cited
UNITED STATES PATENTS
3,423,470  1/1969  Rohr et al. _____ 260—465 X
3,322,525  5/1967  Martin et al. _____ 260—465 X
OTHER REFERENCES
May & Baker Ltd. et al.: Chemical Abstracts, vol. 44, p. 7875 (1950).
LEWIS GOTTS, Primary Examiner
D. H. TORRENCE, Assistant Examiner
U.S. Cl. X.R.
260—465 R, 465 G, 465 H; 424—304